United States Patent
Tsuchitoi

(10) Patent No.: US 8,274,679 B2
(45) Date of Patent: Sep. 25, 2012

(54) INFORMATION PROCESSING APPARATUS AND METHOD OF CONTROLLING THE SAME

(75) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 12/021,919

(22) Filed: Jan. 29, 2008

(65) Prior Publication Data

US 2008/0180709 A1  Jul. 31, 2008

(30) Foreign Application Priority Data

Jan. 31, 2007  (JP) ................................. 2007-022236

(51) Int. Cl.
  *G06F 3/12* (2006.01)
(52) U.S. Cl. ...... 358/1.15; 358/1.9; 358/1.13; 358/1.14; 358/1.16; 358/3.26; 358/3.27; 358/3.28; 382/100; 382/173; 382/175; 382/176; 382/178; 345/611; 345/629; 345/637; 345/641
(58) Field of Classification Search ........................ None
  See application file for complete search history.

(56) References Cited

U.S. PATENT DOCUMENTS

| | | | | |
|---|---|---|---|---|
| 7,526,548 | B2 * | 4/2009 | Tsuyama et al. | 709/225 |
| 7,760,378 | B2 * | 7/2010 | Maruyama | 358/1.15 |
| 2003/0076979 | A1 * | 4/2003 | Matsui | 382/100 |
| 2003/0122940 | A1 * | 7/2003 | Myojo | 348/231.2 |
| 2005/0224571 | A1 * | 10/2005 | Kelley et al. | 235/375 |
| 2006/0233580 | A1 * | 10/2006 | Ueda et al. | 400/62 |
| 2006/0268315 | A1 * | 11/2006 | Randt | 358/1.15 |
| 2008/0068641 | A1 * | 3/2008 | Dance et al. | 358/1.15 |

FOREIGN PATENT DOCUMENTS

JP  2005-072845  3/2005

* cited by examiner

*Primary Examiner* — Marivelisse Santiago Cordero
*Assistant Examiner* — Miya J Cato
(74) *Attorney, Agent, or Firm* — Cowan, Liebowitz & Latman, P.C.

(57) ABSTRACT

This invention deters information leakage by a flexible monitoring method according to the characteristic of an image or document. A job analysis section analyzes a print job and separates image data and attribute information. An image generator generates print image data from the image data by referring to the attribute information. A digital watermark generator and synthesis section embed at least part of the attribute information in the print image data. An image transmitter transmits, to a monitoring server, the print image data with at least part of the attribute information added. A monitoring method selector selectively operates the image transmitter or the digital watermark generator and synthesis section based on the attribute information.

6 Claims, 4 Drawing Sheets

FIG. 2

| | | |
|---|---|---|
| | JOB START INSTRUCTION | 401 |
| ATTRIBUTE SETTING INSTRUCTION | JOB NAME = "PROCEEDINGS OF MEETING" | 402 |
| ATTRIBUTE SETTING INSTRUCTION | HOLDER = "MR. A" | 403 |
| ATTRIBUTE SETTING INSTRUCTION | PRINT DATE/TIME= [2008/6/4 15:00] | 404 |
| ATTRIBUTE SETTING INSTRUCTION | SECURITY LEVEL = "HIGH" | 405 |
| ATTRIBUTE SETTING INSTRUCTION | INFORMATION ACCESS RIGHT LEVEL = "HIGH" | 406 |
| ATTRIBUTE SETTING INSTRUCTION | IMAGE QUALITY LEVEL = "HIGH" | 407 |
| PDL TRANSFER INSTRUCTION | PDL DATA | 408 |
| | JOB END INSTRUCTION | 409 |

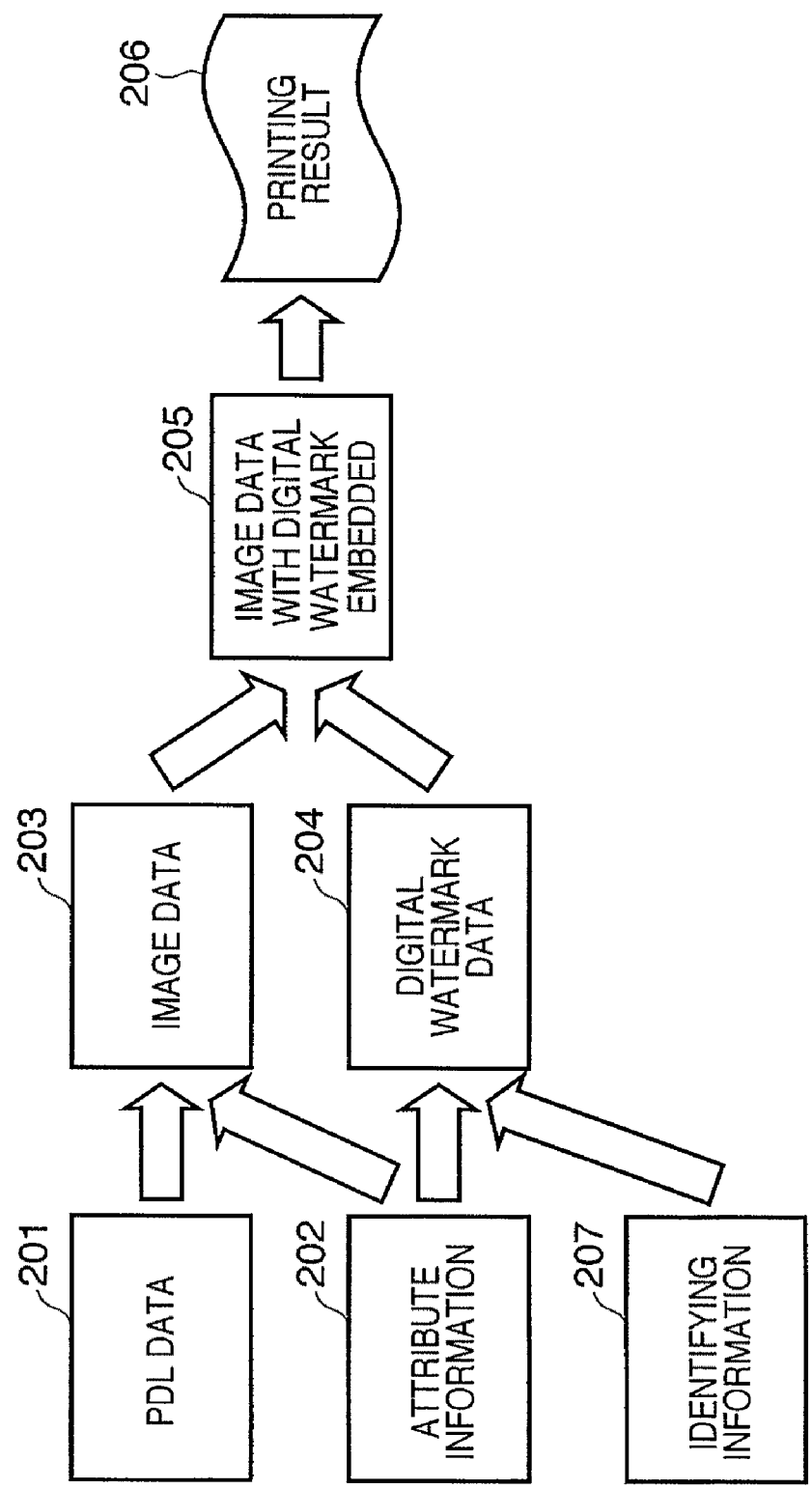

INFORMATION PROCESSING APPARATUS AND METHOD OF CONTROLLING THE SAME

BACKGROUND OF THE INVENTION

1. Field of the Invention

The present invention relates to information processing of deterring information leakage.

2. Description of the Related Art

Recently, many corporations leak their customer's individual information, and such a violation of individual privacy has become a serious social problem. In that respect, interest in securities for the office information technology (IT) is growing.

To prevent confidential information from leaking outside a corporation, generally, access rights are set for digitized confidential information, or a monitoring device is added to a firewall. Alternatively, various measures are taken, and for example, personnel are inhibited from carrying, e.g., a notebook personal computer (PC) or a portable storage medium such as a USB (Universal Serial Bus) memory into or from an office.

Leakage of digitized confidential information can be prevented by deciding and executing monitoring policies as described above. For confidential information printed on a medium such as a printing paper sheet, however, it is more difficult to detect and inhibit carry-out of the printing paper sheet than for digitized confidential information. In other words, printed confidential information makes it difficult to maintain security.

To cope with this problem, various monitoring systems have been proposed. One of the monitoring systems stores image data printed on a printing paper sheet in a server at the time of printing by a printing apparatus, i.e., when the risk of information leakage via the printed matter has occurred. At this time, image data associated with attribute information such as the name of the user who has printed and the printing execution time is stored in the server. If information leakage via the printed matter has occurred, the server is searched for the image data corresponding to the leaked confidential information, thereby specifying the user who has printed the leaked confidential information on the printing paper sheet and the time of printing.

Another monitoring system adds attribute information such as user name and printing execution time to an image printed on a printing paper sheet using a digital watermark or two dimensional code at the time of printing. If information leakage via the printing paper sheet has occurred, and the image of the leaked information can be acquired, the user who has printed the leaked confidential information on the printing paper sheet and the time of printing can be specified using an apparatus for analyzing the digital watermark or two dimensional code.

The above-described monitoring systems have an effect of deterring information leakage and an effect of obtaining information useful for tracking of information leakage.

On the other hand, a user sometimes wants to avoid degradation in image quality caused by addition of a digital watermark or two dimensional code depending on the characteristic of an image to be printed. Japanese Patent Laid-Open No. 2005-072845 discloses a monitoring method of coping with a degradation in image quality by selectively using a visible barcode and an invisible digital watermark in accordance with the application purpose of a document. However, the method of Japanese Patent Laid-Open No. 2005-072845 still requires manipulation of an image itself.

Hence, a demand has arisen for a method capable of preventing degradation in image quality in accordance with the characteristic of an image or document.

The degradation in image quality can be prevented by employing the monitoring system that stores image data printed on a printing paper sheet in a server at the time of printing by a printing apparatus. However, since all printed image data are stored in the server, the amount of image data stored in the server is enormous. It is therefore difficult to search for the image data of a printed matter that has caused information leakage.

SUMMARY OF THE INVENTION

In one aspect, an information processing apparatus comprises an analyzer, arranged to analyze a print job and separate image data and attribute information from the print job; a generator, arranged to generate print image data from the image data by referring to the attribute information; an embedding section, arranged to embed at least part of the attribute information in the print image data; a transmitter, arranged to transmit, to a server, the print image data with at least part of the attribute information added; and a selector, arranged to selectively operate the embedding section and the transmitter based on the attribute information.

According to the aspect, it is possible to deter information leakage by a flexible monitoring method according to the characteristic of an image or document.

Further features of the present invention will become apparent from the following description of exemplary embodiments with reference to the attached drawings.

BRIEF DESCRIPTION OF THE DRAWINGS

FIG. 2 is a view for explaining the concept of the structure of a print job;

FIG. 3 is a conceptual view for explaining digital watermark embedding; and

DESCRIPTION OF THE EMBODIMENTS

Information processing according to the embodiments of the present invention will be described below in detail with reference to the accompanying drawings.

First Embodiment

Arrangement of Apparatus

Figure 1:
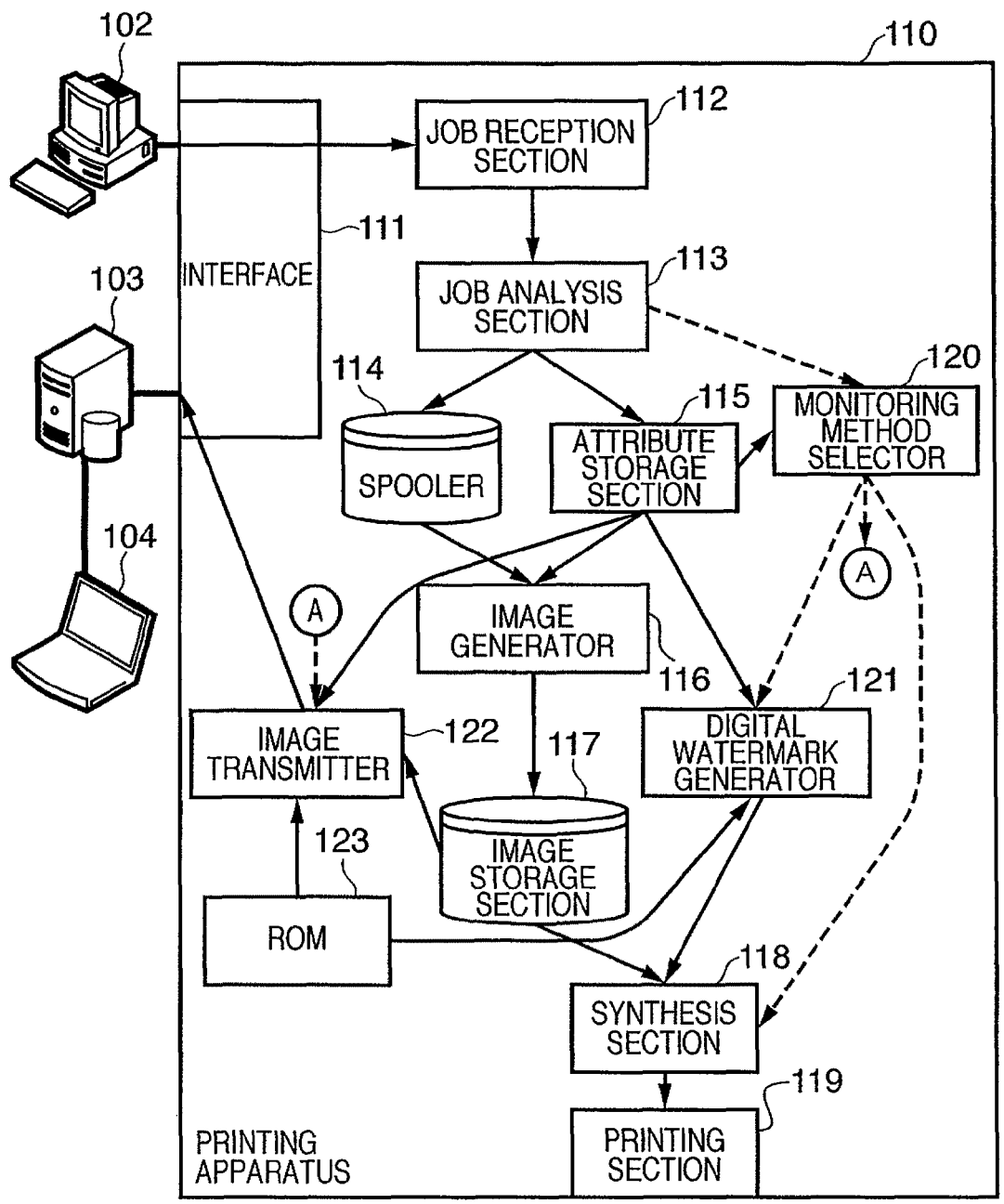
FIG. 1 is a block diagram showing the functional arrangement of a printing apparatus for executing image processing according to an embodiment.

FIG. 1 is a block diagram showing the functional arrangement of a printing apparatus 110 for executing image processing according to the embodiment. Solid lines connecting blocks indicate the flow of data. Broken lines indicate the flow of instructions.

The printing apparatus 110 receives a print job from a client PC 102 via an interface 111 such as a network interface and transmits the image data of the print job to a monitoring server 103. A client PC 104 connected to the monitoring server 103 is a monitoring agent which searches the monitoring server 103 for desired image data.

The printing apparatus 110, client PC 102, monitoring server 103, and monitoring agent (client PC) 104 are connected to each other via a wired network or wireless network. If a plurality of monitoring servers 103 exist on the network, the monitoring server 103 to which the printing apparatus 110 transmits image data is predetermined.

A job reception section 112 of the printing apparatus 110 receives a print job from the client PC 102 and outputs it to a job analysis section 113. The job analysis section 113 analyzes the received print job, extracts page description language (PDL) data and attribute information, and outputs them to a spooler 114 and attribute storage section 115. The spooler 114 is a storage device which temporarily stores PDL data until analysis of the PDL data finishes. The attribute storage section 115 temporarily holds attribute information such as "job name", "print date/time", "(job) holder", and "image quality level" of the print job until the process of the print job finishes.

An image generator 116 renders the PDL data stored in the spooler 114 on the basis of the attribute information held by the attribute storage section 115, thereby generating print image data. An image storage section 117 is a storage device which temporarily stores the image data generated by the image generator 116 until the end of printing. A digital watermark generator 121 generates digital watermark data from the attribute information held by the attribute storage section 115. A synthesis section 118 synthesizes the digital watermark data generated by the digital watermark generator 121 with the image data acquired from the image storage section 117, thereby generating image data with the digital watermark embedded. A printing section 119 is a printer engine which prints an image represented by the image data output from the synthesis section 118 on a medium such as a printing paper sheet by using a printing technique such as electrophotography or inkjet printing. The printing section 119 requires a technique of supplying, conveying, and discharging the medium in addition to the printing technique, and a description thereof will be omitted.

A monitoring method selector 120, image transmitter 122, and read-only memory (ROM) 123 will be described later.

[Structure of Print Job]

The structure of a print job will be described next. FIG. 2 is a view for explaining the concept of the structure of a print job. The client PC 102 is assumed to transmit instructions sequentially from the upper side to the lower side of FIG. 2. The actual data arrangement of print data has no particular restrictions and can use a general print job language (PJL) or packet language.

A job start instruction 401 indicates the start of the print job.

An attribute setting instruction 402 following the job start instruction 401 indicates a print job name which is "proceedings of meeting" in this example. An attribute setting instruction 403 indicates a print job holder (user) which is "Mr. A" in this example. An attribute setting instruction 404 indicates a print job print date/time (issue date/time) which is "Apr. 6, 2005 15:00" in this example. An attribute setting instruction 405 indicates a print job security level which is "high" in this example. An attribute setting instruction 406 indicates the information access right level of the print job holder, which is "high" in this example. An attribute setting instruction 407 indicates a print job image quality level which is "high" in this example.

A PDL transfer instruction 408 following the attribute setting instructions is a portion that transfers PDL data for image data generation. A job end instruction 409 following the PDL transfer instruction 408 indicates the end of the print job.

The job name is a readable name that enables a user to recognize and identify the print job. The holder is represented by the login name of the user (print instructor) who has instructed printing from the client PC 102.

As the print date/time, date/time information indicated by the internal clock of the client PC 102 when printing is instructed on the client PC 102 is recorded. The security level indicates the degree of security (e.g., restricted) of the document which is selectively set by the user.

The information access right level indicates the level of information accessible by the user who operates the client PC 102 (for example, the information access right level must be "high" to access customer's individual information). The image quality level indicates the image quality required of the printed document. When "high" is set as the image quality level, the image quality must not degrade.

The user can arbitrary set the job name, security level, and image quality level via a printer driver running on the client PC 102. On the other hand, the holder and information access right level depend on the information specific to the user who instructs printing. These pieces of information and the print date/time cannot arbitrarily be set and rewritten by the user.

[First Monitoring Method]

When the printing section 119 starts printing, the image transmitter 122 of the printing apparatus 110 acquires the image data of a print job corresponding to the printing from the image storage section 117. Additionally, the image transmitter 122 acquires the attribute information (all or at least some of the pieces of attribute setting instructions 402 to 407 in FIG. 2) of the print job from the attribute storage section 115 and also acquires, from the ROM 123, identifying information for specifying the printing apparatus 110. The image transmitter 122 adds the acquired attribute information and identifying information to the acquired image data and transmits it to the monitoring server 103 via the interface 111. The combination of attribute information and identifying information will be referred to as "additional information" hereinafter. The image data with the additional information is preferably compressed and transmitted.

The monitoring server 103 receives the image data and additional information of all print jobs executed in the office and stores the received image data and additional information in a storage device such as a hard disk. The monitoring server 103 can either store image data with additional information attached or associate image data with additional information and then separately store them.

The monitoring agent 104 can browse the image data stored in the monitoring server 103 and their additional information (compressed additional information is decompressed and then browsed). When information leakage via a printed image is detected, the administrator searches for image data including the leaked information by operating the monitoring agent 104 and refers to the additional information added to (associated with) the image data. This allows to track the user who has instructed printing, the apparatus used for printing, and the time of printing of the printed matter that has caused information leakage.

[Second Monitoring Method]

FIG. 3 is a conceptual view for explaining digital watermark embedding.

A print job includes PDL data 201 and attribute information 202. As described above, the job analysis section 113 analyzes a print job and separates the PDL data 201 and attribute information 202. The image generator 116 renders image data 203 on the basis of the PDL data 201 and attribute information 202.

The digital watermark generator 121 generates digital watermark data on the basis of information which is necessary for monitoring and is extracted from the attribute information 202 and identifying information 207 (i.e., additional information) stored in the ROM 123. The synthesis section 118 generates image data 205 by embedding the digital watermark. Digital watermark data 204 is invisibly embedded in the image data 203 by using a known technique such as sample value embedding or a method using a frequency domain. The printing section 119 prints the image data 205 with the digital watermark embedded on a medium and outputs printed matter (printing result) 206.

When the image of the printed matter 206 is read, and the digital watermark is analyzed, the monitoring agent embedded as the digital watermark data can be extracted. When information leakage via the printed matter is detected, the administrator acquires the printed matter (or its image data) that caused information leakage. This allows to track the user who has instructed printing, the apparatus used for printing, and the time of printing of the printed matter that has caused information leakage.

[Choosing of Monitoring Method]

In the first monitoring method, a process of causing the printing apparatus 110 to transmit image data to the monitoring server 103 is necessary. Hence, the throughput of the printing apparatus 110 may lower. Additionally, since image data is transmitted from the printing apparatus 110 to the monitoring server 103 via the network, network traffic increases. When all image data printed in the office are stored in the monitoring server 103, the amount of image data stored in the monitoring server 103 is enormous, and the maintenance cost such as a storage device adding cost and server maintenance cost is not negligible. In case of information leakage, it becomes more difficult to search for the image data of the printed matter that caused information leakage as the amount of image data stored in the monitoring server 103 increases. In other words, the search becomes difficult in proportion to the amount of image data stored in the monitoring server 103.

On the other hand, the second monitoring method requires no image data transmission and storage in the monitoring server 103. For this reason, the problems of the decrease in throughput, the increase in traffic, the increase in cost, and the difficulty in the search are not posed. However, since the digital watermark data 204 is embedded in the image data 203, the image quality degrades. To guarantee addition of information in a permissible range of degradation in image quality, the amount of additional information embeddable in the image data 203 is limited. In addition, an attacker can intentionally attack the digital watermark embedded in the image to make it unreadable.

To prevent this, the monitoring method selector 120 of the printing apparatus 110 of this embodiment causes the apparatus to selectively execute the first monitoring method or second monitoring method in accordance with the characteristic of the image or document to be printed.

Figure 4:
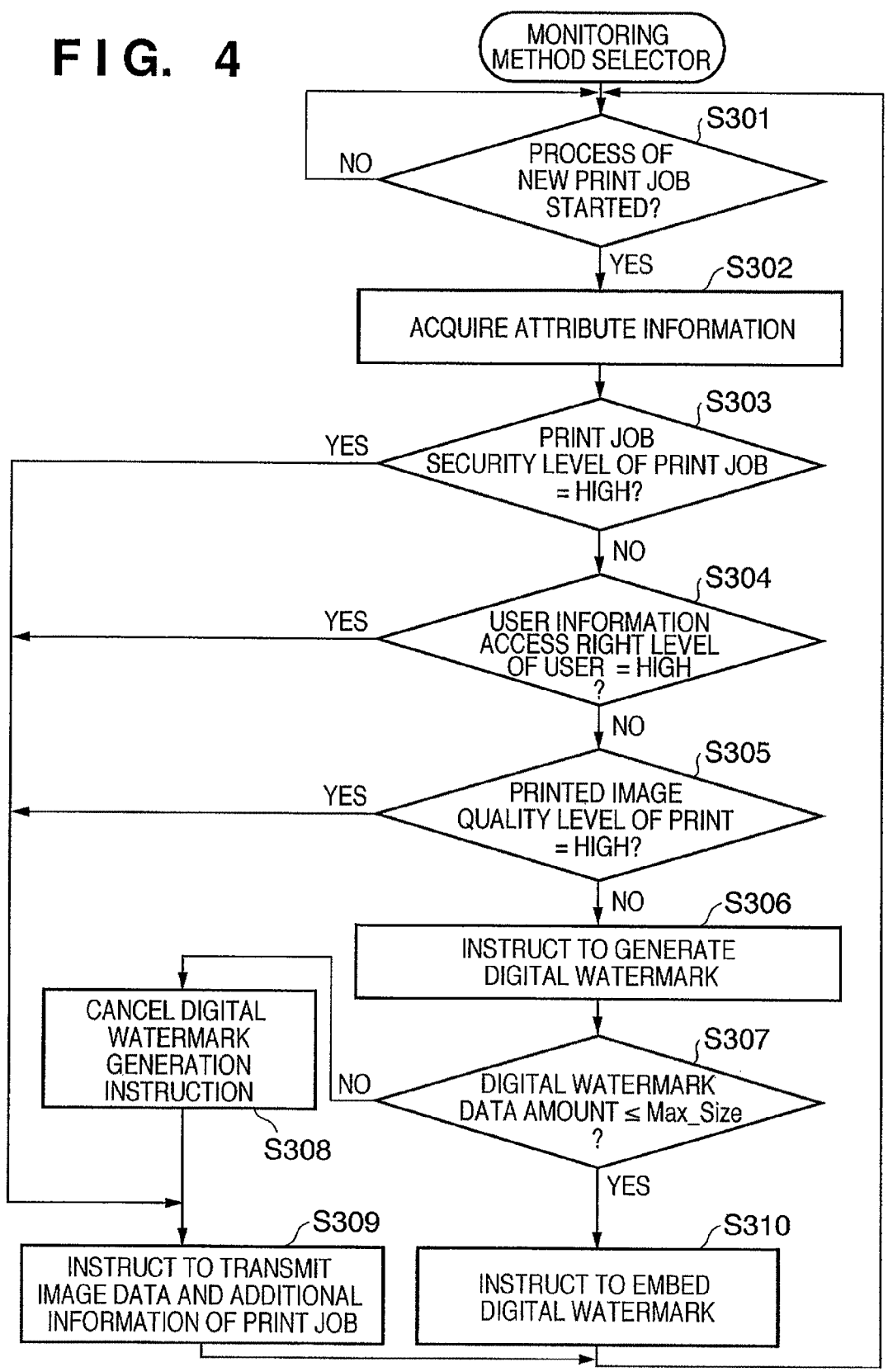
FIG. 4 is a flowchart for explaining the operation of a monitoring method selector.

FIG. 4 is a flowchart for explaining the process of the monitoring method selector 120. The monitoring method selector 120 is activated simultaneously with the start of the operation of the printing apparatus 110 and continues the operation until the printing apparatus 110 is powered off.

The monitoring method selector 120 monitors the operation of the job analysis section 113 and detects that the job analysis section 113 has started processing a new print job (S301). Upon detecting the start of the process of the new print job, the monitoring method selector 120 acquires the attribute information of the new print job from the attribute storage section 115 (S302) and determines, on the basis of the characteristic feature of the print job indicated by the acquired attribute information, which monitoring method should be employed, the first monitoring method or second monitoring method (S303 to S307).

First, the monitoring method selector 120 determines the security level indicated by attribute information (S303). The security level is information that can be set by the user who instructs printing. For, e.g., a confidential image or document such as a restricted image or document, the security level is set at "high". If the security level is "high", the monitoring method selector 120 selects not the second monitoring method that can receive an attack to make the digital watermark unreadable but the first monitoring method that ensures reliable monitoring.

If the security level is not "high", the monitoring method selector 120 determines the information access right level indicated by attribute information (S304). For a user in a department accessible to confidential information such as a customer's individual information management department, the information access right level is set at "high". If the information access right level is "high" the monitoring method selector 120 regards that printing of the confidential information is instructed at a high probability, and selects not the second monitoring method that can receive an attack to make the digital watermark unreadable but the first monitoring method that ensures reliable monitoring.

If the information access right level is not "high", the monitoring method selector 120 determines the image quality level indicated by attribute information (S305). The image quality level is information that can be set by the user who instructs printing. For, e.g., a multi-tone high-quality photo image, the image quality level is set at "high". If the image quality level is "high", the monitoring method selector 120 selects not the second monitoring method that degrades the image quality upon embedding a digital watermark but the first monitoring method without degradation in image quality.

When the first monitoring method is selected, the monitoring method selector 120 instructs the image transmitter 122 to transmit the image data and additional information of the print job to the monitoring server 103 (S309).

If the security level is not "high", the information access right level is not "high", and the image quality level is not "high", the second monitoring method is usable. In this case, the monitoring method selector 120 instructs the digital watermark generator 121 to generate a digital watermark for the print job (S306).

Upon receiving the digital watermark generation instruction, the digital watermark generator 121 acquires the attribute information of the print job from the attribute storage section 115, acquires identifying information from the ROM 123, and puts necessary information into additional information. The digital watermark generator 121 generates a digital watermark on the basis of the additional information and notifies the monitoring method selector 120 of the data amount of the digital watermark.

The monitoring method selector 120 compares a data amount Size received from the digital watermark generator 121 with a maximum value Max_Size of the data amount in a permissible range of degradation in image quality (S307). If Size≦Max_Size, the monitoring method selector 120 instructs the synthesis section 118 to embed the digital watermark data in the image data (S310). Hence, the second monitoring method is selected and executed.

If it is determined that Size≧Max_Size, the monitoring method selector 120 cancels the digital watermark generation instruction to prevent degradation in image quality (S308). The monitoring method selector 120 instructs the image transmitter 122 to transmit the image data and additional information of the print job to the monitoring server 103 (S309). Hence, the first monitoring method is re-selected and executed.

As described above, if the security level is "high", the information access right level is "high", or the image quality level is "high", or if an impermissible degradation in image quality is expected to occur upon embedding a digital watermark, the first monitoring method is executed. Conversely, if the security level is not "high", the information access right level is not "high", and the image quality level is not "high", and the degradation in image quality that occurs upon embedding a digital watermark is expected to fall within the permissible range, the second monitoring method is executed.

In other words, the first monitoring method is executed only for a print job which requires reliable monitoring and has "high" security level or "high" information access right level or a print job which should avoid degradation in image quality and has a "high" image quality level. It is therefore unnecessary to store all image data printed in the office and their additional information in the monitoring server 103. That is, it is possible to solve the problems of the decrease in throughput, the increase in traffic, the increase in maintenance cost, and the difficulty in the search. It is also possible to prevent degradation in image quality of an image or document which should avoid degradation in image quality.

For a print job that does not satisfy the conditions for the first monitoring method, the second monitoring method is executed. However, if the amount of additional information is large, the amount of digital watermark data is large, and the degradation in image quality is expected to fall outside the permissible range, the first monitoring method is executed.

In the above manner, the method of storing image data and additional information in the monitoring server 103 and the method of embedding additional information in an image to be printed on a medium are selectively executed in accordance with the characteristic of a print job. It is therefore possible to implement a safe and efficient monitoring system capable of mutually compensating for the problems of the first and second monitoring methods.

[Modification]

An example using a digital watermark has been described above. A two dimensional code such as a QR Code® defined by ISO/IEC18004 may be used in place of the digital watermark. The digital watermark is invisible, whereas the two dimensional code is visible. The digital watermark can be embedded in an entire medium surface, whereas the two dimensional code is printed at part of a medium surface. However, these differences do not influence the practice and effect of the present invention.

Second Embodiment

Information processing according to the second embodiment of the present invention will be described below. The same reference numerals as in the first embodiment denote the same components in the second embodiment, and a detailed description thereof will be omitted.

In the first embodiment, an example has been described in which the first monitoring method and second monitoring method are selectively executed. In the second embodiment, a case will be explained in which importance is placed on how to overcome the problem of the first monitoring method.

As the problem of the first monitoring method, when information leakage has occurred, it is time-consuming to search for the image data of a printed matter that has caused information leakage from an enormous amount of image data.

In the first monitoring method, only image data and additional information are transmitted to the monitoring server 103. However, in case of information leakage, it is difficult to search for the image data of the printed matter that has caused information leakage. For example, an index search may be done using keywords extracted from image data by optical character recognition (OCR). However, the index search also has a limit because of the problem of the character recognition rate.

As a solution to this problem, a monitoring method selector 120 controls a digital watermark generator 121 to embed additional information in the image data of a printed matter even when the first monitoring method is selected. In this case, however, the additional information need only contain minimum attribute information or identifying information necessary for narrowing down image data from additional information associated with image data stored in a monitoring server 103. Hence, additional information in this case includes one (or if needed, some) of the job name, holder, print date/time, and identifying information while giving priority for suppressing degradation in image quality. With this arrangement, if information leakage has occurred, additional information embedded by a digital watermark can be extracted from the printed matter (or its image data) that has caused information leakage, and the image data stored in the monitoring server 103 can be narrowed down. It is consequently possible to quickly search for the image data of the printed matter that has caused information leakage and find it in a short time. It is also possible to minimize degradation in image quality of the printed matter.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-022236, filed Jan. 31, 2007, which is hereby incorporated by reference herein in its entirety.

What is claimed is:

1. An information processing apparatus comprising:
an analyzer, arranged to analyze a print job and separate image data and attribute information from the print job;
a generator, arranged to generate print image data from the image data by referring to the attribute information;
an embedding section, arranged to embed at least part of the attribute information in the print image data;
a transmitter, arranged to transmit, to a server, the print image data with at least part of the attribute information added; and
a selector, arranged to selectively operate the embedding section and the transmitter based on at least one of the attribute information and an amount of digital watermark data generated from at least part of the attribute information by the embedding section,
wherein the selector selects the operation of the transmitter and does not select the operation of the embedding section in a first case where at least one of a security level of the image data, an information access right level of a print instructor, and an image quality level of printing is high, the security level, the information access right level, and the image quality level being represented by the attribute information,
wherein the selector selects the operation of the embedding section and does not select the operation of the transmitter in a second case where the security level, the information access right level, and the image quality level are low, and the amount of digital watermark data is equal to or less than a maximum value of a data amount in a permissible range of degradation in image quality, and
wherein the selector selects the operation of the transmitter and does not select the operation of the embedding section in a third case where the security level, the information access right level, and the image quality level are low, and the amount of digital watermark data is greater than the maximum value.

2. The apparatus according to claim 1, further comprising a printing section, arranged to print an image represented by the print image data on a medium.

3. The apparatus according to claim 1, wherein when the operation of the transmitter is selected, the selector controls the embedding section to embed minimum attribute information to narrow down the print image data stored in the server.

4. The apparatus according to claim 1, further comprising a memory which holds identifying information that specifies the information processing apparatus and is embedded by the embedding section together with the part of the attribute information or transmitted by the transmitter together with the part of the attribute information.

5. A method of controlling an information processing apparatus which has an analyzer arranged to analyze a print job and separate image data and attribute information from the print job, a generator arranged to generate print image data from the image data by referring to the attribute information, an embedding section arranged to embed at least part of the attribute information in the print image data, and a transmitter arranged to transmit, to a server, the print image data with at least part of the attribute information added, the method comprising:
the step of selectively operating the embedding section and the transmitter based on at least one of the attribute information and an amount of digital watermark data generated from at least part of the attribute information by the embedding section,
wherein the operation of the transmitter is selected and the operation of the embedding section is not selected in a first case where at least one of a security level of the image data, an information access right level of a print instructor, and an image quality level of printing is high, the security level, the information access right level, and the image quality level being represented by the attribute information,
wherein the operation of the embedding section is selected and the operation of the transmitter is not selected in a second case where the security level, the information access right level, and the image quality level are low, and the amount of digital watermark data is equal to or less than a maximum value of a data amount in a permissible range of degradation in image quality, and
wherein the operation of the transmitter is selected and the operation of the embedding section is not selected in a third case where the security level, the information access right level, and the image quality level are low, and the amount of digital watermark data is greater than the maximum value.

6. A non-transitory computer-readable medium storing a computer-executable program for causing a computer to perform a control method of an information processing apparatus which has an analyzer arranged to analyze a print job and separate image data and attribute information from the print job, a generator arranged to generate print image data from the image data by referring to the attribute information, an embedding section arranged to embed at least part of the attribute information in the print image data, and a transmitter arranged to transmit, to a server, the print image data with at least part of the attribute information added, the method comprising the step of selectively operating the embedding section and the transmitter based on at least one of the attribute information and an amount of digital watermark data generated from at least part of the attribute information by the embedding section,
wherein the operation of the transmitter is selected and the operation of the embedding section is not selected in a first case where at least one of a security level of the image data, an information access right level of a print instructor, and an image quality level of printing is high, the security level, the information access right level, and the image quality level being represented by the attribute information,
wherein the operation of the embedding section is selected and the operation of the transmitter is not selected in a second case where the security level, the information access right level, and the image quality level are low, and the amount of digital watermark data is equal to or less than a maximum value of a data amount in a permissible range of degradation in image quality, and
wherein the operation of the transmitter is selected and the operation of the embedding section is not selected in a third case where the security level, the information access right level, and the image quality level are low, and the amount of digital watermark data is greater than the maximum value.

* * * * *